US008265089B2

(12) United States Patent  
McCoy et al.

(10) Patent No.: US 8,265,089 B2
(45) Date of Patent: Sep. 11, 2012

(54) NETWORK GATEWAY WITH ENHANCED REQUESTING

(75) Inventors: Joseph McCoy, Frankfort, NY (US); Joshua White, Ilion, NY (US)

(73) Assignee: Everis, Inc., Franfort, NY (US)

( * ) Notice: Subject to any disclaimer, the term of this patent is extended or adjusted under 35 U.S.C. 154(b) by 239 days.

(21) Appl. No.: 12/636,955

(22) Filed: Dec. 14, 2009

(65) Prior Publication Data

US 2011/0058562 A1 Mar. 10, 2011

Related U.S. Application Data

(60) Provisional application No. 61/239,989, filed on Sep. 4, 2009.

(51) Int. Cl.
*H04L 12/28* (2006.01)
(52) U.S. Cl. ......... 370/401; 370/469; 370/352; 370/474
(58) Field of Classification Search ........................ None
See application file for complete search history.

(56) References Cited

U.S. PATENT DOCUMENTS

| 6,990,531 | B2 | 1/2006 | Vange |
| 7,020,783 | B2 | 3/2006 | Vange et al. |
| 7,123,583 | B2 * | 10/2006 | Hoar et al. ................. 370/230 |
| 8,014,317 | B1 * | 9/2011 | Ghosh et al. ................ 370/254 |
| 2003/0126467 | A1 | 7/2003 | Noghanian et al. |
| 2007/0291780 | A1 * | 12/2007 | Smith et al. ................. 370/411 |
| 2009/0077668 | A1 | 3/2009 | Noghanian et al. |

* cited by examiner

*Primary Examiner* — Duc C Ho
(74) *Attorney, Agent, or Firm* — George R. McGuire; David B. Woycechowsky; Bond Schoeneck & King

(57) ABSTRACT

A gateway and/or software for running on a gateway that communicates data units from a connection based network to a connectionless network, where the gateway uses at least some network protocol data from the connection based network in checking against a set of rules to determine whether some responsive reaction is appropriate. Preferably, the network protocol data from the connection based network is low level network protocol data (that is, physical layer and/or data link layer) that would otherwise be discarded by the gateway as the data was de-encapsulated and sent along to the receiving, connectionless network. Some possible responsive reactions include: selectively blocking data communication; slowing down selected data communications; sending responsive communications back to selected data sending machines; and/or alerting of network administrator(s).

20 Claims, 6 Drawing Sheets

NETWORK GATEWAY WITH ENHANCED REQUESTING

RELATED APPLICATION

The present application claims priority to U.S. provisional patent application No. 61/239,989, filed on 4 Sep. 2009; all of the foregoing patent-related document(s) are hereby incorporated by reference herein in their respective entirety(ies).

BACKGROUND OF THE INVENTION

1. Field of the Invention

The present invention relates to a data communication networks connected by gateways and more particularly (in some preferred embodiments (see DEFINITIONS section) to a gateway connecting a connection-based wide area network ("WAN") to a connectionless local area network ("LAN").

2. Description of the Related Art

Two conventional types of data communication networks are: (i) connection-based; and (ii) connectionless. Often, but not necessarily, WANs are connectionless. Often, but not necessarily, LANs are connection based. Conventionally, a computer or set of computers, called a gateway, can be used to pass communications in both directions between a connectionless network and a connection based network. Some conventional connection oriented WAN protocols include SONET, ATM, and DSC. Two conventional connectionless protocols are TCP and UDP.

When data is sent from a sender computer to a receiver computer, it will conventionally go through a series of networks. For example, the data may be sent first through a connectionless LAN (the sender-side LAN), and then through a connection-oriented WAN, and then through another connectionless LAN (the receiver side LAN) before reaching the receiver computer. Along the way, the data is generally bundled with other data as it travels away from the sender computer, and then unbundled again as it gets toward the receiver computer. To illustrate this bundling and unbundling of data, an exemplary data transfer will now be described: (i) the data travels from the sender computer and through the sender side LAN in a connectionless manner in the form of an individual packet which is not bundled together and/or bundled with other data packets from other senders; (ii) as the packet leaves the sender side LAN to enter the WAN, it is bundled into a multiple packet data unit (MPDU) with other data packets from the same sender and/or from other senders; (iii) the MPDU then travels through the WAN in a connection oriented manner; (iv) as the MPDU leaves the WAN to enter the receiver side LAN it is unbundled back into a multiplicity of individual packets, including the packet being followed with attention in this example; (v) the packet then travels through the receiver side LAN in a connectionless manner to arrive at the receiver side computer. Sometimes the bundling and unbundling is more complex. For example, lower level MPDUs may be hierarchically aggregated into higher level MPDUs. As a further example, there may be additional WANs and/or LANs through which the packet travels at various levels of multiple packet bundling.

Somewhat related to this idea of packet bundling into MPDUs is the idea of layers of network protocol information. For example, conventional Open System Interconnection data ("OSI data") is conventionally communicated over WANs. Conventional OSI data has seven layers of network protocol information which will now be discussed in the following seven paragraphs, which discussion proceeds from the "lowest level" network protocol layer to the "highest level" network protocol layer.

(1) PHYSICAL LAYER DATA. The Physical Layer provide required information regarding electrical and physical specifications for devices, specifically the relationship between a device and a physical medium. For example, this may include the layout of pins, voltages, cable specifications, hubs, repeaters, network adapters, Host Bus Adapters (HBAs used in Storage Area Networks) and so on. The Physical Layer data indicates to a device how to transmit to the medium, and indicates to another device how to receive from it (in most cases it does indicate to the devices how to connect to the medium). Some Physical Layer protocols and/or standards include: RS-232; V.35; V.34; I.430; I.431; T1; E1; 802.3 Ethernet; 10BASE-T; 100 BASE-TX; POTS; SONET; DSL; 802.11a/b/g/n PHY; and ITU-T G.hn PHY. Data communication devices of the type that conventionally operate at the Physical Layer will herein be called "physical layer devices."

(2) DATA LINK LAYER DATA. The Data Link Layer data provides the information required to transfer data between network entities. The Data Link Layer data may also provide information required to detect and/or correct errors that may occur in the Physical Layer. The Data Link Layer was initially intended for point-to-point and point-to-multipoint media, characteristic of certain telephone system networks. Because of the way Local area network ("LAN") architecture developed historically, the Data Link Layer is not always used very extensively in LANs, but it is often used in WANs. Some Data Link Layer protocols and/or standards include: ARP; CSLIP; SLIP; Frame Relay; and ITU-T G.hn DLL. Data communication devices of the type that conventionally operate at layers going down to the Data Link layer will herein be called "data link layer devices." Physical Layer devices and Data Link layer devices will herein be collectively called "low level devices." Physical Layer network protocol data and Data Link Layer network protocol data will herein be collectively called "low level network protocol data."

(3) NETWORK LAYER DATA. The Network Layer data provides the information required to communicate variable length data sequences from a source to a destination over one or more networks, while maintaining the appropriate quality of service. The Network Layer data provides the information required to perform network routing functions. The Network Layer data may also provide the data required to perform fragmentation and reassembly, and to report delivery errors. Routers typically operate at the Network Layer. Some Network Layer protocols and/or standards include: IP; ICMP; IPsec; and IGMP. Data communication devices of the type that conventionally operate at layers going down to the Network Layer will herein be called "network layer devices."

(4) TRANSPORT LAYER DATA. The Transport Layer data provides information required for transparent transfer of data between end users and for providing reliable data transfer services to the upper layers. The Transport Layer data provides information used to control the reliability of a given link through flow control, segmentation/desegmentation, and/or error control. Transport Layer Data also includes source information data (for example, a source IP header) and destination information data (for example, a destination IP header). Some Transport Layer protocols and/or standards include: TCP; UDP; PPTP; L2TP; and SCTP. Data communication devices of the type that conventionally operate at layers going down to the Transport Layer will herein be called "transport layer devices."

(5) SESSION LAYER DATA. The Session Layer data provides information required to controls the dialogues (or connections) between computers. The Session Layer data provides information required to establish, manage and terminate the connections between the local and remote application. Some Session Layer protocols and/or standards include: Named Pipes; NetBIOS; and SAP. Data communication devices of the type that conventionally operate at layers going down to the Session Layer will herein be called "session layer devices."

(6) PRESENTATION LAYER DATA. The Presentation Layer data provides the information required to establish a context between Application Layer entities, in which the higher-layer entities can use different syntax and semantics, as long as the Presentation Service understands both and the mapping between them. The presentation service data units are then encapsulated into Session Protocol Data Units, and moved down the stack. Some Presentation Layer protocols and/or standards include: MIME; XDR; SSL; and TLS. Data communication devices of the type that conventionally operate at layers going down to the Presentation Layer will herein be called "presentation layer devices."

(7) APPLICATION LAYER DATA. The Application Layer is the OSI layer closest to the end user. This means that both the user and the Application Layer interact directly with the software application. The Application Layer interacts with software applications that implement a communicating component. Such application programs are outside of the scope of the OSI model. The Application Layer Data provides information required to identify communication partners, determine resource availability, and synchronize communication. Some Application Layer protocols and/or standards include: NNTP; SIP; SSI; DNS; FTP; Gopher; HTTP; NFS; NTP; SMPP; SMTP; SNMP; and Telnet. Data communication devices of the type that conventionally operate at layers going down to the Application Layer will herein be called "application layer devices." Network Layer devices, Transport Layer devices, Session Layer devices, Presentation Layer devices and Application Layer devices will herein be collectively called "high level devices." Network Layer network protocol data, Transport Layer network protocol data, Session Layer network protocol data, Presentation Layer network protocol data and Application Layer network protocol data will herein be collectively called "high level network protocol data."

Above the highest level of network protocol information itself is the substantive data itself, which is herein referred to as the payload. Now, a single, indivisible packet of data, sent from a particular sender computer to a particular receiver computer will typically include high level network protocol data. For example, an individual packet sent according to TCP/IP protocol will include in its header network protocol data at all of the following layers: (i) Network Layer; (ii) Transport Layer; (iii) Session Layer; (iv) Presentation Layer; and (v) Application Layer. However, when that packet is bundled with other packets into an MPDU, then the header of the MPDU will typically include additional low level network protocol data. More specifically, conventionally the MPDU includes a map of where the high level protocol is packed. In some instances it will keep "switching" information that speeds end to end flow. Some processes aim to optimize service by "sorting" relevant "pieces" from layers in a streamlined fashion.

Returning to the above example of a packet transfer, attention is draw to the above-mentioned step where the MPDU leaves the WAN to enter the receiver side LAN and is unbundled back into a multiplicity of individual packets. At this step, in conventional gateways, the network protocol information in the MPDU header is effectively discarded and lost as part of the unbundling of the MPDU into individual packets (or, in other network configurations into smaller MPDUs). The exact information that is expected to be, and generally is, discarded (or shed) at the WAN-to-LAN gateway will depend upon the specific WAN and/or LAN architectures being used, but in many, or perhaps most, conventional networks, it is only the MPDU header that is shed as the MPDU is broken down into smaller MPDUs or into packets.

The above described OSI reference model, set forth above and also in ISO 7948, is helpful background for understanding the operation of some embodiments of the present invention as will be discussed below in following sections of this document. However, it should be pointed out that not all networks have the relatively rigid and granular OSI type layering described above. For example, one frequently referenced document, RFC 1958, which deals with an alternative approach to network communications, does not contain a stack of layers at all. RFC 1122, a document relating to host requirements loosely defines a four-layer model, with the layers having names, not numbers, as follows: Application (process-to-process) Layer; Transport (host-to-host) Layer; Internet (internetworking) Layer; and Link Layer: It is also helpful to understand that some network protocol information (now existing or to be developed in the future) may not structured in the form of ordered layers, and some network protocol may not have a layered structure at all. This is helpful background for the present invention, because some embodiments of the present invention may be applied to network communications having: (i) no layers at all; (ii) having layers, but layers not ordered from lowest to highest; or (iii) having ordered layers which are different in number and/or kind from the OSI layer model for network protocol data set forth above.

U.S. Pat. No. 7,020,783 ("Vange 1") discloses a data communication network including a system for handling denial of service attacks. More specifically, FIG. 3 of Vange 1 shows a network 101 with equipment 201, 203, 212 for preventing denial of service attacks. As Vange 1 is understood, network 101 is a Network Layer network or a Transport Layer network, which means that network 101 is a high level network. Network 101 is a connection oriented network.

U.S. Pat. No. 6,990,531 (Vange 2") discloses systems and methods for prioritizing data traffic over a shared bandwidth connection. The systems and methods of Vange 2 are implemented in the "last mile" and not at a cloud edge.

Prior art publications which may be of interest may include: (i) US published patent application 2009/0077668 ("Noghanian 1"); and (ii) US published patent application 2003/0126467 ("Noghanian 2").

Description Of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

BRIEF SUMMARY OF THE INVENTION

Software, hardware, systems and/or methods according to the present invention will sometimes be described using the word WaGER, which stands for WAN Gateway Enhanced Requesting.

WaGER can be deployed as both an in-line appliance for active control of the connection point to (or within) the connection based network or as a monitor that sends alerts/alarms for manual intervention and control. MPDUs (made up of constituent data packets or smaller MPDUs) come through a connection based network, such as the connection based networks included within the internet, from a variety of sources that may be known sources or unknown sources or a combination of known and unknown sources. These MPDUs pass from the connection based network to a receiver side connectionless network and thence to a receiving machine (such as a server computer or a user computer). Again, the receiver side connectionless network may be part of what is commonly called as the internet. For example, an MPDU might include a packet embodying a server service request, sent from the connection based network, thence to a the gateway at the receiving edge of the connection based network (where the packet is de-encapsulated from the MPDU), thence (as a packet) through the connectionless network, and finally to the server computer at the receiving end where the service request packet can be processed and responded to.

The packet will include certain network protocol in its header, and this network protocol data is generally high level network protocol data. However, the MPDU, in its header, will also include additional network protocol data, which is generally low level network protocol data. This network protocol data (of high level and/or low level) includes signaling, path set up, flow and related metadata that is generally invisible to end users but necessary, or at least helpful, to accomplish information transfer across the combined connectionless/connection-oriented network infrastructure. This network protocol data can generally be characterized by according to the seven OIS communication layers identified above in the Background section.

According to the present invention, an MPDU is dissected by a gateway for logical organization of the data, network protocol data (including the above-mentioned network metadata) at various layers. Once the dissected "subject data set" of the MPDU (or of a set of multiple MPDUs) is so dissected, rule-based analysis is applied to the subject data set. These rules, applied in the rule-based analysis, can suggest certain "responsive reactions." These responsive reactions are corrective actions that are taken by the gateway to help facilitate organized flow through the data communication system.

The rule of use and acceptable policy are preferably programmed into gateways according to the present invention with the focus on operation assurance for the intended functionality of the receiver side connectionless network's hosted Web service. Upon receiving a request for information from a sender side connectionless network through a connection-oriented network that lies between the sender and receiver side connectionless networks, the request is dissected to create "library information" (also sometimes called a "subject data set"). The library information is then correlated against rules which are design to help ensure that the request is deemed acceptable. Preferably, the gateway includes a rules database that provides for mass storage of: (i) the rules themselves; and (ii) values for the variables associated with the rules or analysis. Upon rule-based analysis, the information from the sender side connectionless network may either flow to the receiver side connectionless network as it does in comparable prior art gateways, or it may be subject to some kind of responsive reaction. The responsive reactions include (but are not necessarily limited to): (i) filtering (also sometimes referred to as blocking; (ii) being regulated to be sent at a different timing (for example, over a greater time) than it otherwise would; (iii) being subject to reallocation of resources by being sent over different network resources than it otherwise would; and/or (iv) being subject to an administrator alert.

For example, a filter may completely terminate the information to prevent negative impact on the receiver side connectionless network and/or on performance of the (intended) receiving machine (for example, an end server). As yet another example of a responsive reaction, an "additional inspection" software portion may redirect the information which forces it to perform: (i) further dissection for additional library information; and/or (ii) further rules-bases analysis based on the library information. As yet another example of a responsive reaction, the information to be sent to the receiver side connectionless network and to the receiving machine may be partially stripped of certain information to prevent possible detrimental affects to the receiver side connectionless network and/or the receiving machine. As yet another example of a possible responsive reaction, the gateway may send the requestor (that is, the sender machine) information to either discourage it from sending suspicious communications or to modify its performance in a way which will not cause concern about detrimental affects that might be cause by its communications (for example its requests to servers). Besides these examples of possible responsive reactions, other responsive reactions may be possible or may become possible in the future as network protocols and/or network architectures continue to evolve over time.

Various embodiments of the present invention may exhibit one or more of the following objects, features and/or advantages:

(i) its use imposes no extra end user configuration end, such as static ARP tables or dedicated routing contexts;

(ii) can be used in any IP network deployments;

(iii) facilitate more time efficient transmission data through communication networks;

(iv) facilitate more network resource efficient transmission of data through communication networks;

(v) help prevent accidental detrimental affects caused by unintentionally problematic network communications; and/or (vi) help prevent intentional detrimental affects caused by malicious network communications, such as denial of service attacks and spoofing.

According to one aspect of the present invention, a computer communication network system includes: a source computer, an MPDU aggregating module, a connection-based network, a gateway, a receiver-side connectionless network, and a receiver computer. The source computer is structured, and/or data-communication-connected to send a first packet, with the first packet including destination information indicating that it is intended to be sent to and received by the receiver computer. The MPDU aggregating module is structured, programmed and/or data-communication-connected to receive the first packet from the source computer and to aggregate it into a first MPDU, where the first MPDU is in a form and format suitable to be communicated over the connection-based network. The connection-based network is structured, programmed and/or data-communication-connected to receive the first MPDU from the MPDU aggregating module and to communicate it to the gateway in a connection-based manner. The gateway is structured, programmed and/or data-communication-connected to receive the first MPDU from the connection-based network, to disaggregate the first MPDU into a plurality of smaller data units (DUs) including a first DU at least partially constituted by the first packet, and to selectively communicate the first DU to the receiver-side connectionless network. The receiver-side connectionless network is structured, programmed and/or data-communication-connected to receive the first DU from the gateway on condition that it was selectively communicated by the gateway, and to communicate at least the first data packet portion of the first DU to the receiver computer in a connectionless manner. The gateway is structured, programmed and/or data-communication-connected to: (i) collect selected network protocol data from the first MPDU, with the selected network protocol data including at least some network protocol data included in the first MPDU and not included in any of the plurality of DUs; (ii) apply a first rule to the selected network protocol data, and (iii) make a responsive reaction based, at least in part, upon the application of the first rule to the selected network protocol data.

According to another aspect of the present invention, a gateway for use in a computer communication network system, the gateway includes: a gateway module and an enhanced requesting module. The gateway module is structured, programmed and/or data-communication-connected to receive a first MPDU from a connection-based network of the computer communication network system, to disaggregate the first MPDU into a plurality of smaller data units (DUs), and selectively communicate the first DU to a receiver-side connectionless network of the computer communication network system. The enhanced requesting module is structured, programmed and/or data-communication-connected to: (i) collect selected network protocol data from the first MPDU, with the selected network protocol data including at least some network protocol data included in the first MPDU and not included in any of the plurality of DUs; (ii) apply a first rule to the selected network protocol data; and (iii) make a responsive reaction based, at least in part, upon the application of the first rule to the selected network protocol data.

According to a further aspect of the present invention, a process of communicating a data unit through a computer communication network system includes the following steps (to be performed in any order so far as may be operationally possible): (i) receiving, by a gateway, a first MPDU from a connection-based network of the computer communication network system; (ii) disaggregating, by the gateway, the first MPDU into a plurality of smaller data units (DUs); (iii) collecting, by the gateway, selected network protocol data from the first MPDU, with the selected network protocol data including at least some network protocol data included in the first MPDU and not included in any of the plurality of DUs; (iv) applying, by the gateway, a first rule to the selected network protocol data; (v) making, by the gateway, a responsive reaction based, at least in part, upon the application of the first rule to the selected network protocol data; and (vi) selectively communicating, by the gateway, the first DU to a receiver-side connectionless network of the computer communication network system.

BRIEF DESCRIPTION OF THE DRAWINGS

The present invention will be more fully understood and appreciated by reading the following Detailed Description in conjunction with the accompanying drawings, in which.

DETAILED DESCRIPTION OF THE INVENTION

Figure 1:
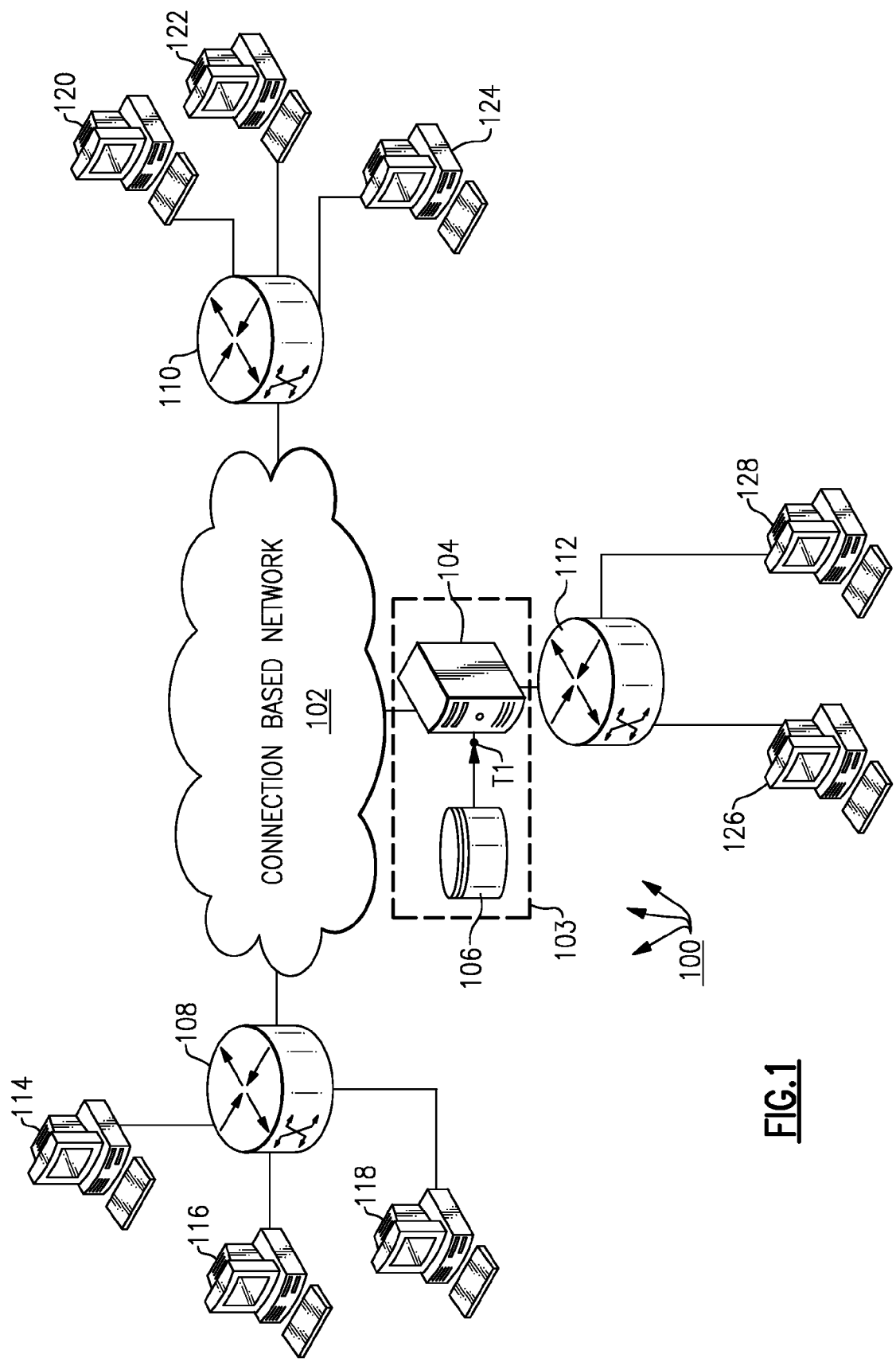
FIG. 1 is a schematic view of a data communication system including a gateway according to the present invention.

FIG. 1 shows data communication system 100 according to the present invention including connection based network 102; WaGER gateway 103; first connectionless network 108; second connectionless network 110; third connectionless network 112; and communicator computers 114, 116, 118, 120, 122, 124, 126, 128. The WaGER gateway includes WaGER gateway computer 104; and rules database 106. Generally speaking, all of the communicator computers can communicate, in both directions, with each other through the connectionless and connection based network 102 as shown in FIG. 1. For purposes of the following discussion, communicator computer 114 (also referred to as the sender computer) sends a packet through the first connectionless network (which also may be referred to as the sender side connectionless network), then through the connection based network, then through the WaGER gateway computer, then through the third connectionless network (also called the receiver side connectionless network) and finally to communicator computer 126 (also referred to as the receiver computer). While much of the operation of system 100 is identical to the prior art discussed above in the Background section, the present invention relates to operation of WaGER gateway 103, which will be discussed in detail below.

Figure 2:
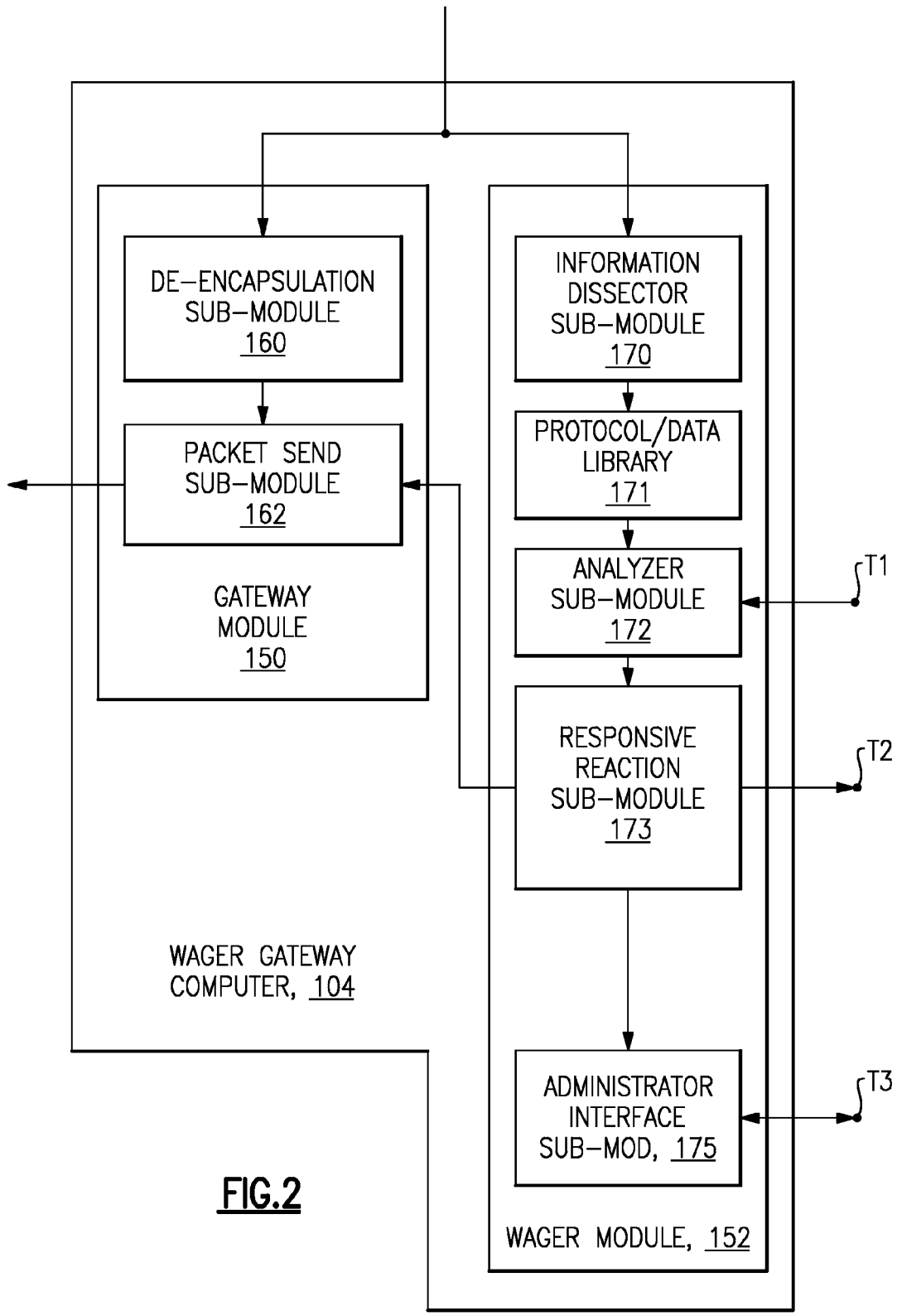
FIG. 2 is a schematic view of a first embodiment gateway according to the present invention.

As shown in FIG. 2, WaGER gateway computer 104 includes gateway module 150; and WaGER module 152. The gateway module includes de-encapsulation sub-module 160; and packet send sub-module 162. The WaGER module includes: information dissector sub-module 170; protocol/data library 171; analyzer sub-module 172; responsive reaction sub-module 173; and administrator interface sub-module 175. The WaGER gateway computer may be any type of computer now known or to be developed in the future that has sufficient speed, processing power memory and other specifications sufficient to support the operations ascribed to it herein. Currently, the preferred computer to be used as the WaGER computer is the CyOON Hammerhead which is supplied by Everis, Inc. of Frankfort, N.Y.

The gateway module may be similar to currently-conventional gateway software, or may be any type of suitable gateway software to be developed in the future. One commercially available type of gateway software suitable for use with at least some embodiments of the present invention is Cisco ONS 15540 Extended Service Platform (ESP) software supplied by Cisco Systems, Inc. of San Jose, Calif.

Referring to FIGS. 1 and 2, in the gateway module of the WaGER gateway computer, the de-encapsulation sub-module receives the MPDU from connection based network 102 and removes the MPDU header in order to break the MPDU up into its constituent data packets (which each have their own data packet headers). As in conventional data communication systems, the de-encapsulation sub-module effectively discards the MPDU header so that its network protocol data (for example, its low level network protocol data) is lost. The packets are then sent to the packet send sub-module, and from there they are sent into the receiver side connectionless network 112. It is noted that because these packets still have their packet headers, they still have some network protocol data (for example, high level network protocol data), which network protocol data is generally sufficient to get each packets navigated through the receiver side connectionless network and to its respective receiver computer. However, as will be discussed below, the operation of the responsive reaction sub-sub-module of the WaGER module may have some affect on whether or how a given packet, or set of packets, is communicated through the packet send sub-module of the gateway module to the receiver side connectionless network.

Figure 6:
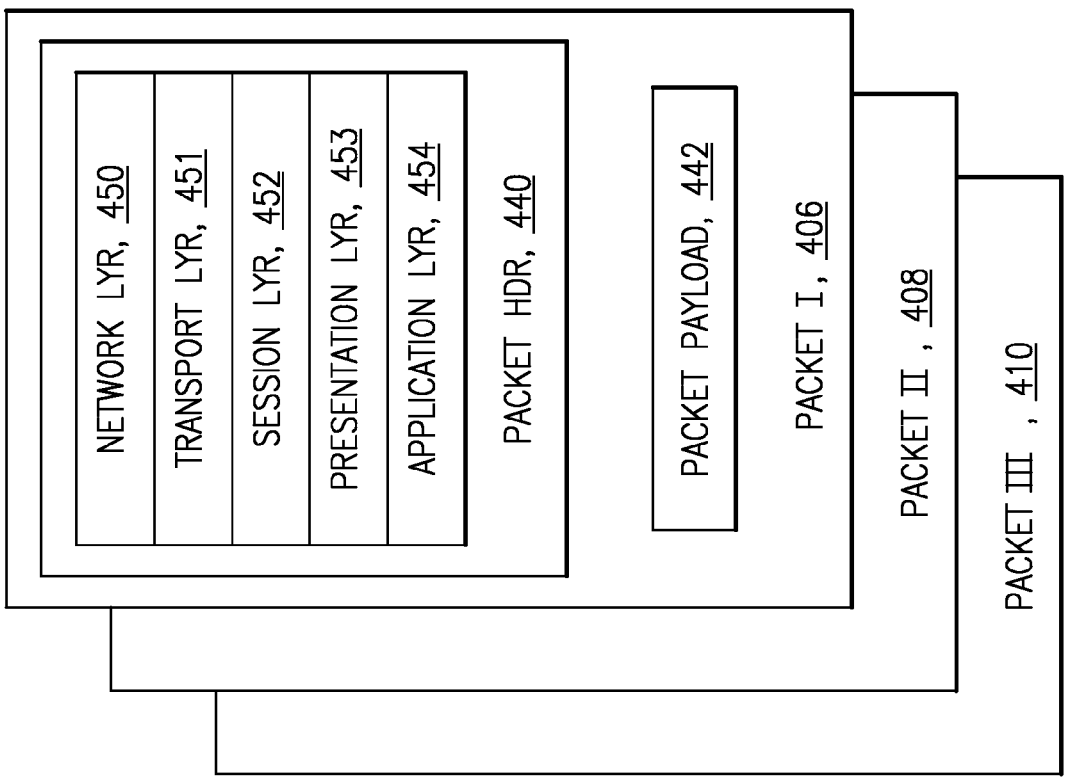
FIG. 6 is a schematic view of an MPDU and associated data packets communicated through the first embodiment system.

The exemplary de-encapsulation performed by the de-encapsulation sub-module is shown schematically in FIG. 6. At the left hand side of FIG. 6 is a pre-de-encapsulation MPDU 401 which contains three individual data packets 406, 408, 410 and MPDU header 404. The MPDU header includes physical link layer network protocol data 412 and data link layer network protocol data 414. The low level network protocol data in the MPDU header was needed for the MPDU to navigate through the connection based network 102 (see FIG. 1). In the de-encapsulation process illustrated in FIG. 6, de-encapsulation unbundles the three individual packets 406, 408, 410 so that they can be sent separately though other network(s), such as connectionless receiver side network 112. Each of these three individual packets includes a packet header (with high level network protocol information) and a packet payload. For example, packet I 406 includes: packet header 440 (including network layer network protocol data 450, transport layer network protocol data 451, session layer network protocol data 452, presentation layer network protocol data 453 and application layer network protocol data 454); and packet payload 442.

In this preferred embodiment, the MPDU is preferably structured for transmission by Synchronous optical networking (SONET) and is structured according to GR-253-CORE. More specifically, the MPDU is preferably structured according to SONET Tx Rx protocol. Basic information about SONET network protocols is currently published at the SONET Wikipedia entry at the following URL: http://en.wikipedia.org/wiki/Synchronous_optical_networking.

In this preferred embodiment, individual packets are preferably TCP/IP protocol packets having a structure and packet header structured described at RFC 793 (TCP portion) and RFC 791 (IP portion).

Some possible variations on the exemplary embodiment of FIG. 6 will now be identified: (i) the MPDU might include smaller, constituent MPDUs, instead of individual, indivisible packets; (ii) the MPDU header 404 might include some high level network protocol data (for example, network layer network protocol data); (iii) the packet header 440 might include some low level network protocol data (for example, data link layer network protocol data); and/or (iv) some network protocol data layers might be absent, especially if they are not needed for the particular connectionless and/or connection based network through which the packets must travel to get from their sender(s) to their respective destination(s). However, despite the many possible variations, FIG. 6 shows the more general idea that some network protocol data, and especially lower level network protocol data, is removed when the gateway between the connection based network and the connectionless network performs de-encapsulation in its data. Generally speaking, it is this "lost" network protocol data that the present invention seeks to exploit for various purposes in the gateway.

Returning to FIG. 2, and more particularly to the WaGER module of FIG. 2, MPDU 401 is also sent to information dissector sub-module 170 for dissection. The equipment of the gateway in this preferred embodiment includes a SONET Tx Rx optical interface (not separately shown) with a processor (not shown), which equipment provides information dissector module 170 with the raw data and processing power to perform its dissection of the MPDU as will now be described.

Figure 3:
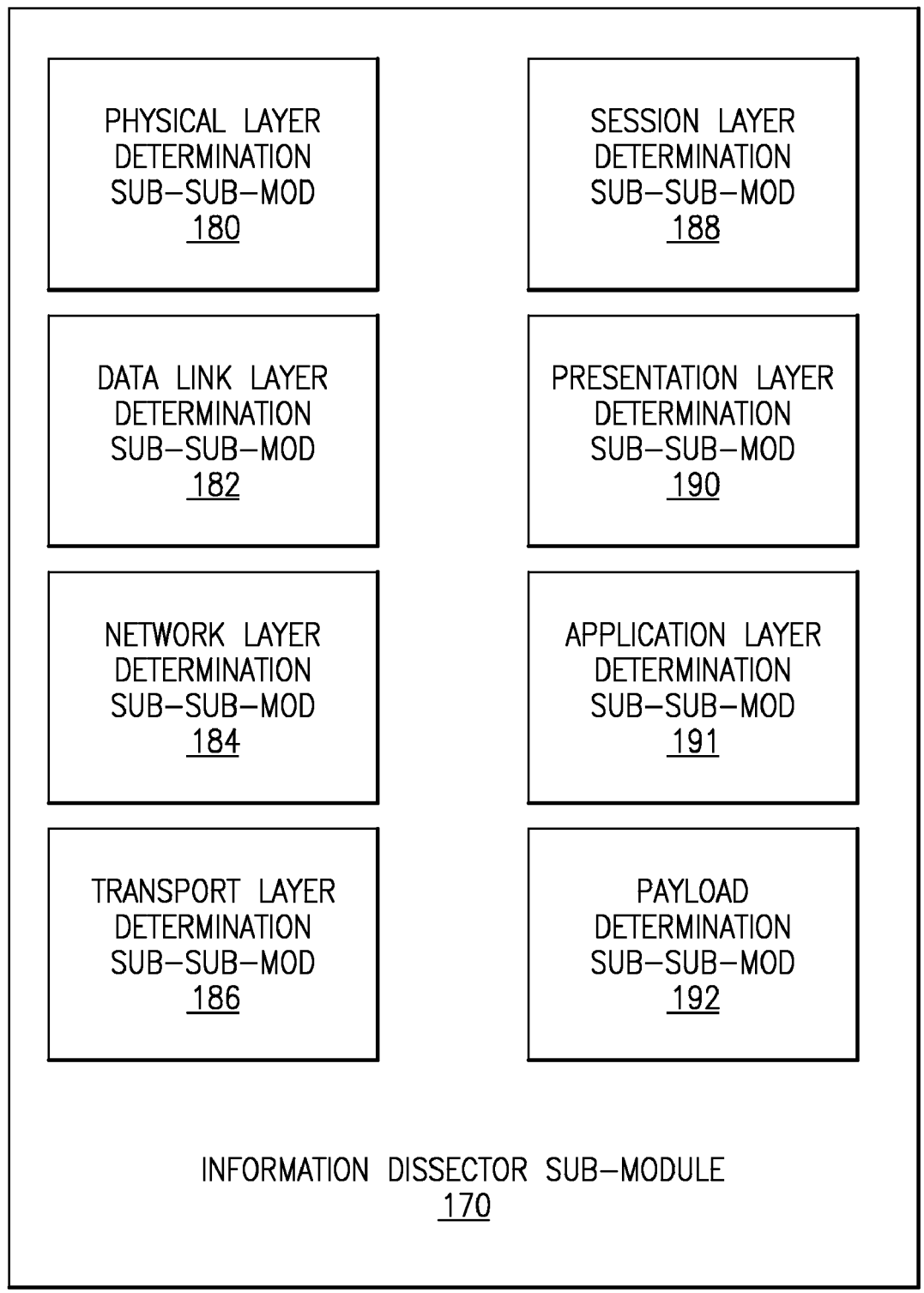
FIG. 3 is a schematic view of a portion of the software of the first embodiment gateway.

FIG. 3 shows a schematic of the information dissector sub-module, which includes: physical layer network protocol data determination sub-sub-module 180; data link layer network protocol data determination sub-sub-module 182; network layer network protocol data determination sub-sub-module 184; transport layer network protocol data determination sub-sub-module 186; session layer network protocol data determination sub-sub-module 188; presentation layer network protocol data determination sub-sub-module 188; application layer network protocol data determination sub-sub-module 191; and payload determination sub-sub-module 192.

In this exemplary embodiment of the present invention, network protocol data from each and every layer is determined, but this is not necessarily true in all embodiments of the present invention. In this exemplary embodiment of the present invention, the payload data, or at least certain characteristics of the payload data is determined, but this is not necessarily true in all embodiments of the present invention. In this embodiment of the present invention, network protocol data from both the MPDU header and from the headers of the individual constituent packets is determined, this is not necessarily true in all embodiments of the present invention. However, it is preferred that at least some of the network protocol data of the MPDU packet header, which is discarded by de-encapsulation as explained above in connection with FIG. 6, is determined by the information dissector sub-module so that this information, which would otherwise be lost due to de-encapsulation, can be used by the gateway for various objectives as further discussed below.

It is noted that dissecting every bit of information out of the MPDU is favorable because it is a very robust approach with respect to facilitating any and all kinds of analysis, rules and/or pattern recognition. On the other hand, dissecting every bit of information out of an MPDU uses a relatively large amount of computer processing resources and a relatively large amount of time. Therefore, when designing an information dissector sub-module according to the invention, care must be taken so that the dissection does not overwhelm the resources of the gateway computer, and so that dissection is performed quickly enough so that any responsive reactions (discussed in more detail below) can occur in a timely fashion before it is too late to have a salutary affect on selective data transmission, transmission speed, network resource allocation and the like.

Generally speaking, the less dissection that is performed at the information dissector sub-module, the more smoothly the gateway can operate. Still, dissection must be sufficient so that the desired types of rules, analysis, pattern recognition, etc. can be applied to the dissected data. For example, some embodiments of the present invention may dissect the MPDU header for information only, and forego dissection of any constituent, smaller MPDUs and/or data packets, thereby saving time, but also foregoing the use of any rules that rely on the use of network protocol information and/or payload information "below" the top level MPDU header.

Returning attention again to FIG. 2, the various network protocol data and/or payload data characteristics are sent from the information dissector sub-module to protocol/data library 171 where it is temporarily retained for purposes of analysis and application of rules. In at least some preferred embodiments, a buffer memory is used for this temporary storage. Other types of memories (now known or to be developed in the future) could alternatively be used. In at least some preferred embodiments, the information is stored for the amount of time necessary to implement and/or apply the rules. Statistics may also be performed on protocol type, which is something retained for adaptive rule implementation. In other embodiments of the present invention, some or all of the information may be stored for a long term and/or permanently.

Figure 4:
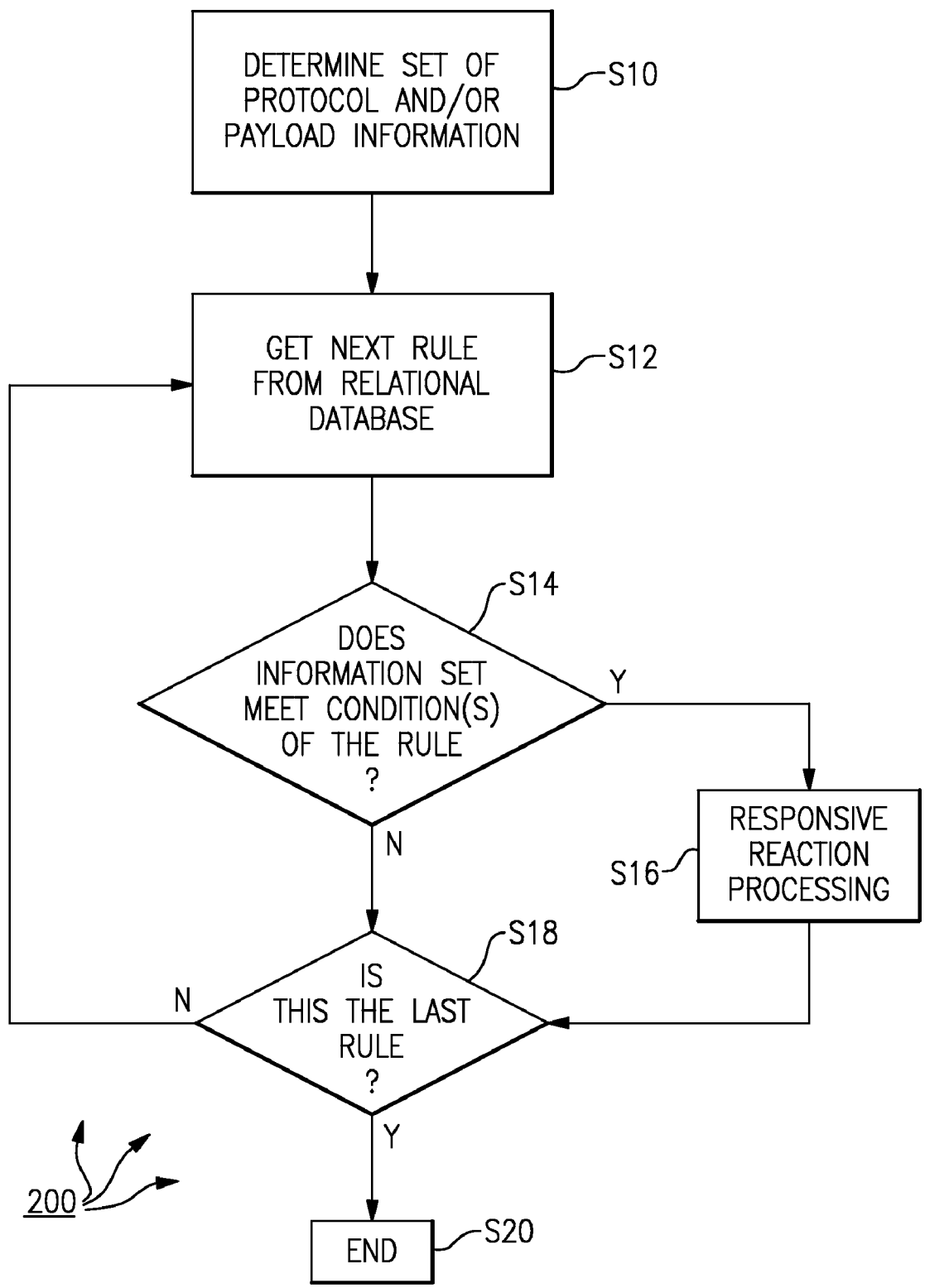
FIG. 4 is a flowchart of a rule based analysis of network protocol data according to the present invention.

As shown in FIGS. 2 and 4, analyzer sub-module 172 actually applies rules against the MPDU related data in protocol/data library 171 to determine whether any responsive reactions are appropriate, depending upon the content of and/or patterns in the network protocol data and/or payload related data of an MPDU or a set of MPDUs. As shown by terminal T1 in FIGS. 1 and 2, the analyzer sub-module receives the applicable rules from rules database 106. In FIG. 1, rules database is shown to be a separate component from the WaGER gateway computer, but it may be: (i) contained within the WaGER gateway computer 103; and/or (ii) distributed over many locations and/or components. Preferably, the rules database is a relational database that provides for network ID look-up based on international registration and updated accordingly. The rules in the rules database may be entirely predetermined, or they may be adaptively learned. Any parameters included in the rules may be entirely predetermined, or may be adaptively scaled by learning. The rules preferably include at least some guidance as to the appropriate responsive reaction that is to occur when that rule is found to be met during the rule-based analysis process.

Referring to FIG. 4, the analysis process 200 of the analyzer sub-module starts at step S10 where the MPDU or set of MPDUs is dissected for germane network protocol data and/or payload related data as explained above. Once it has been determined that this subject data is in place in the protocol/data library at step S10, processing proceeds to step S12. At the initial instance of step S12, a first rule is retrieved from rules database 106 (see FIG. 1), and processing proceeds to step S14. At step S14, the retrieved rule is applied to the subject data set by the analyzer sub-module. If the subject data set does not meet the rule, the processing proceeds to step S18. On the other hand, if the subject data set does meet the rule, then processing proceeds to step S16.

At step S18, the analyzer sub-module determines whether the rule that has just been applied at step S14 is the last applicable rule from rules database 106. If it is the last rule, then processing proceeds to step S20, which is the end of the analysis process for the subject data set. If it is not the last rule, then processing loops back to step S12, where the next rule is retrieved from rules database 106.

At step S16, because a rule has been found to have been met by the analyzer sub-module, responsive reaction processing is performed by responsive reaction sub-module 173 (see FIG. 2). While some types of responsive reactions will be discussed in detail below, generally speaking, responsive reaction means that the performance of the data communication system is changed in some way because of the fact that some rule is met. The change in performance may be strictly informational, such as an alert to an administrator. The change in performance may prevent certain data transfers from occurring, such as when malicious data packets are blocked from passing from the WaGER gateway computer to the receiver side connectionless network. The change in performance may cause additional data from being sent, as when a sender of suspicious packets is sent some kind of response in order to clarify and/or discourage the suspicious data communication activity. the change in performance may affect the timing at which data transfers take place.

There may be other ways that data communication performance is changed, now known or to be developed in the future, by the general class of actions herein called responsive reaction processing. However, it should be noted that this responsive reaction processing is based, at least in part, upon the network protocol information in the header of MPDU 401 (see FIG. 6), and, in preferred embodiments, especially based at least in part on the low level network protocol data of the header of MPDU 401. In conventional connection-oriented-to-connectionless gateways, this data is not utilized and is lost. According to the present invention, it is used (sometimes in conjunction with other data) to cause beneficial changes in network performance.

Figure 5:
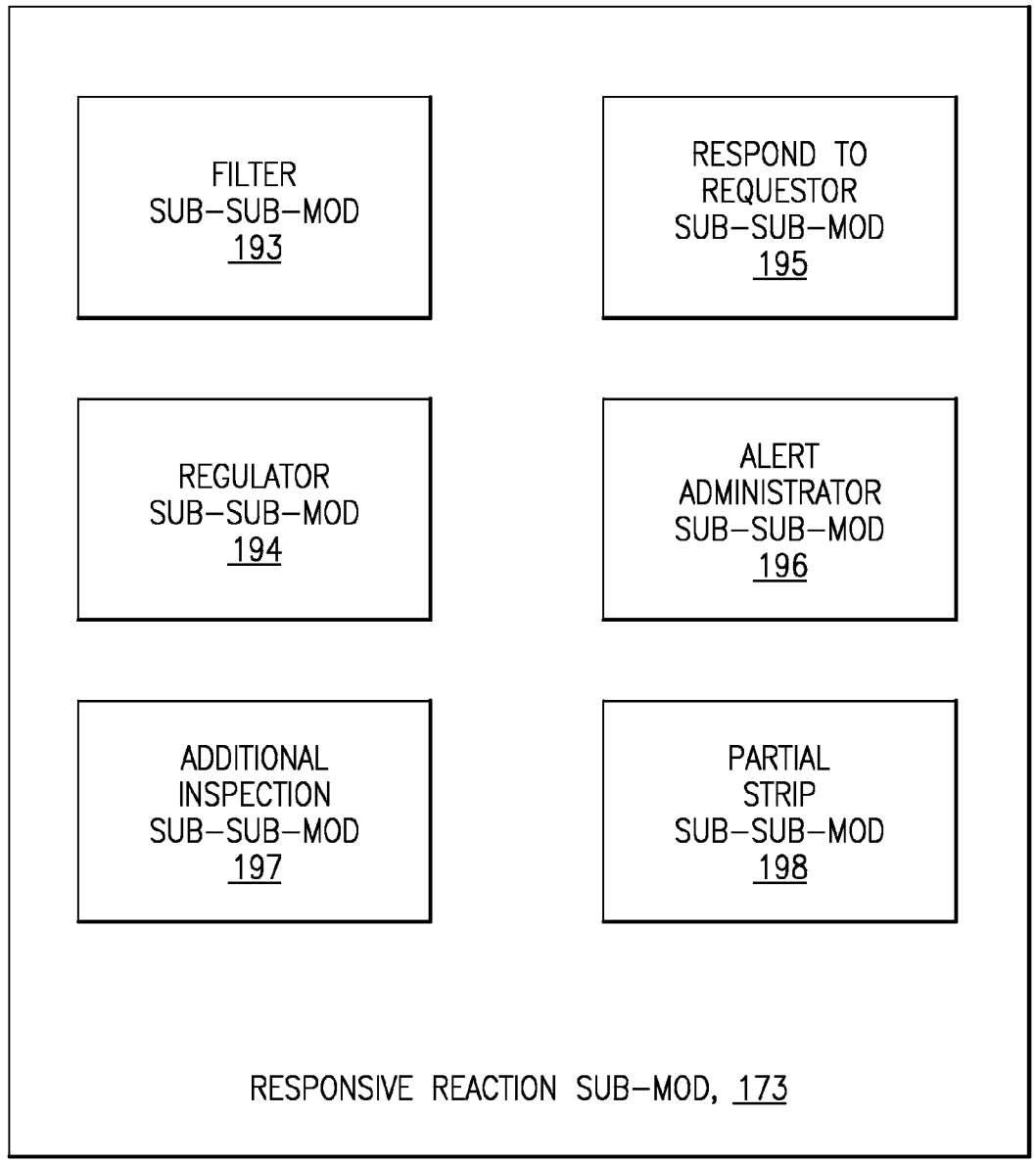
FIG. 5 is a schematic view of a portion of the software of the first embodiment gateway.

As shown in FIG. 5, responsive reaction sub-module 173 includes filter sub-sub-module 193; regulator sub-sub-module 194; respond to requestor sub-sub-module 195; alert administrator sub-sub-module 196; additional inspection sub-sub-module 197; and partial strip sub-sub-module 198.

The filter sub-sub-module acts when a particular rule is met which indicates that certain data packets (or constituent MPDUs of a larger MPDU) should be blocked and not sent along to the receiver side connectionless network. For example, a rule might check the physical layer network protocol data 412 (see FIG. 6) for a set of MPDUs received from the connection-oriented network to determine whether an unusually large proportion of the MPDUs were originating at the same geographic location. While higher level network protocol 450, 451, 452, 453, 454 (see FIG. 6) might be spoofed, it would be much more difficult, or impossible, to spoof the physical layer network protocol data 412 in regards of the geographic location at which the MPDUs entered the connection-oriented network (which is generally, but not necessarily, a WAN). When an unusually large proportion of MPDUs originates from the same geographic and/or IP block location, this is indicative of a malicious denial of service attack. Therefore, when the analyzer sub-module determines that an unusually high proportion of the set of MPDUs received from the connection-oriented network comes from the same geographic location set, it will invoke the filter sub-sub-module of the responsive reaction sub-module to perform the appropriate responsive reaction of directing packet send sub-module 162 of gateway module 150 (see FIG. 2) to block the offending packets and thereby thwart the denial of service attack. It is true that some legitimate packets may be affected, along with the denial of service attack packets, but that is a small price to pay for preventing a denial of service attack from shutting down the server computer which is the receiver computer. The regulator sub-sub-module acts when a particular rule is met which indicates that certain data packets (or constituent MPDUs of a larger MPDU) should be slowed down in their transmission, but not necessarily blocked entirely. For example, a rule might check the physical layer network protocol data 412 (see FIG. 6) for a set of MPDUs received from the connection-oriented network to determine whether an somewhat large proportion of the MPDUs were originating at the same geographic and/or network location. While this somewhat high proportion of MPDUs is not high enough to indicate an outright denial of service attack, it is indicative that an unusually large number of packets may be headed toward the same receiver end server computer for non-malicious reasons. Moreover, this is an efficient indication of an abnormal condition because it looks only to low level physical layer network protocol data, rather than digging down to the higher level network protocol data in the constituent packets. because the somewhat high proportion of packets is indicative of potentially troublesome, but not malicious, intentions, regulator sub-sub-module is called to take appropriate responsive reaction. The regulator sub-sub-module instructs packet send sub-module 162 of gateway module 150 (see FIG. 2) to slow down transmission the offending packets and thereby prevent resources of the receiver end connectionless network and/or the receiver end computer(s) from being accidentally overwhelmed by an abnormal spike in certain network traffic. In the context of the internet, the traditional boarders of nation states have diminished significance. However, the notion of geographic locations is currently tied to IP block assignments law, RFC 1174 and the Internet Assigned Numbers Authority (IANA). For example, with technologies such as "bot armies," a denial of service attack may come from a number of infected computers that may or may not be in the same country. For example, a recent denial of service attack came from Korea because the source computers executing the attack had been infected with malicious code that came from visiting a web site that happened to be frequented by South Koreans. With at least some embodiments of the present invention, a geographic area may be targeted by rule-based analysis, and these geographically oriented rules may be based, for example, on IANA assignments. However, with other embodiments of the present invention, the objective and the focus of the rules may be on something other than geographic areas. For example, some embodiments of the present invention may have as their primary objective, the learning of patterns of normal traffic and so that appropriate responsive reactions can be taken when observed traffic is substantially inconsistent with the norms in some way. A migration policy may initially be set manually, but preferably it is intelligent as described. In this fashion, at least some embodiments of the present invention embrace the dissolution of classic nation state boundaries and move towards an intelligent gateway that is managing the new paradigm of internet diplomacy while insuring operation of the "homeland."

Some preferred embodiments of the present invention, may block or regulate the flow of information, based on an application of the rules-based analysis, by controlling the way that cyclic batch and/or cyclic token-passing medium access processes are performed. For example, based upon the assumption that the administrator has applied a base rule that allows such prioritization, the "immigration policy" (or "migration policy") of allowed communication is established. The dissector "tags" the requestor packet with appropriate policy tag. If a given tag matches to an underutilized rule then the packet goes through. If a given request is tagged with a rule that is "maxed" then one or more of the following exemplary consequences may follow: (i) it may be dropped; (ii) told it has gone through but then dumped; (iii) put into a waiting line that has imposed upon it a rate per time allowed from that tag.

The respond to requestor sub-sub-module responds back to requestor computers at the sending end (see FIG. 2 at terminal T2). For example, in one of the exemplary rules discussed above in connection with the filter sub-sub-module, a denial of service attack was detected by a rule applied by the analyzer sub-module. In addition to blocking the potentially offending packets, the respond to requestor sub-sub-module may additionally apply the responsive reaction of sending data communications back to the sending computer(s) to indicate that the intended receiving computer, which is the target of the denial of service attack, no longer exists, or is refusing communications, or something along those lines to discourage further denial of service attacks.

The alert administrator sub-sub-module instructs administrator interface sub-module 175 (see FIG. 2) to alert an administrator as a responsive reaction. For example, with reference to FIG. 6, assume that another rule applied by the WaGER analyzer sub-module compares low level network protocol data 414 of MPDU to high level network protocol data of transport layer 451 of constituent packet I 406 and determines that there is a mismatch, which strongly indicative of packet spoofing. As a responsive reaction (or part of a responsive reaction), the administrator is alerted so that further forensic investigation can be performed.

The additional inspection sub-sub-module performs a responsive reaction by causes: (i) further dissection of the data of the MPDU(s) to determine more information to include in the subject data set; and/or (ii) further rules-bases analysis based on the subject data set. While this additional inspection takes time, it may be most time efficient to only do certain additional inspection only in cases where the conditions of some threshold rule give cause for heightened suspicion that there may be a need for a responsive reaction.

The partial strip sub-sub-module performs a responsive reaction by partially stripping certain information from the data being transferred to the receiving side connectionless network in order to prevent possible detrimental affects to the receiver side connectionless network and/or the receiving machine.

In a preferred embodiment of the present invention, a DDOS attack is mitigated by applying an "immigration policy" for information requests based on requestor network addresses.

As one fundamental variation on the above described embodiments, some embodiments of the present invention may use network protocol data having an ordered layer structure that is different than the OSI model assumed in connection with the above described embodiment of the present invention. In this variation, there will still be network protocol data in the MPDU header of the MPDU as received from the connection based network, and that network protocol data will still either completely constitute, or at least partially constitute, the library information which is analyzed by rules-based analysis according to the present invention. In this variation, the network protocol data dissected out of the MPDU header will generally and preferably be lower level protocol information.

As another fundamental variation on the above described embodiment, some embodiments of the present invention may have network protocol data that has layers, where the layers have no commonly recognized order. In this variation, there will still be network protocol data in the MPDU header of the MPDU as received from the connection based network, and that network protocol data will still either completely constitute, or at least partially constitute, the library information which is analyzed by rules-based analysis according to the present invention. In this variation, the network protocol data dissected out of the MPDU header will not be characterized as higher or lower level network protocol data, but may still be characterized by the identity of the particular layer(s) that this portion of the network protocol data happens to have.

As another fundamental variation on the above described embodiment, some embodiments of the present invention may have network protocol data that is simply not structured in the form of multiple layers. In this variation, there will still be network protocol data in the MPDU header of the MPDU as received from the connection based network, and that network protocol data will still either completely constitute, or at least partially constitute, the library information which is analyzed by rules-based analysis according to the present invention. Therefore, even these layerless embodiments of the present invention utilize data that connection-based-to-connectionless gateways usually discard.

In the above described embodiment, for an MPDU (or given set of MPDUs), the rules based analysis and any associated responsive reactions are performed before the underlying data (for example, the constituent data packets are transferred out of the gateway computer and to the receiving side connectionless network. In alternative (not necessarily preferred) embodiments of the present invention, the data may be transferred out before the rules based analysis and/or responsive reactions are completed. In fact, substantial time may elapse. For example, a check for spoofing could be done for the day's traffic on a daily basis, rather than on an ongoing basis as in the preferred embodiment described above, which would mean that as much as 23 hours and 59 seconds might elapse between a data transfer through the gateway and the rule check and consequent responsive reaction. This is not preferred because it limits the nature of the responsive reactions that might be taken because it would no longer be possible to filter the transfer of the subject data or to regulate the transfer of the subject data. However, there might still be useful rules and responsive reactions that could be applied. For example, if there are daily traffic patterns that can be used to more optimally allocate network resources, then a responsive reaction in the form of adaptively adjusting a network resources allocation algorithm might be best accomplished by performing the associated rule-based analysis just once a day and adaptively adjusting the allocation algorithm once a day.

DEFINITIONS

Any and all published documents mentioned herein shall be considered to be incorporated by reference, in their respective entireties, herein to the fullest extent of the patent law. The following definitions are provided for claim construction purposes:

Present invention: means at least some embodiments of the present invention; references to various feature(s) of the "present invention" throughout this document do not mean that all claimed embodiments or methods include the referenced feature(s).

Embodiment: a machine, manufacture, system, method, process and/or composition that may (not must) meet the embodiment of a present, past or future patent claim based on this patent document; for example, an "embodiment" might not be covered by any claims filed with this patent document, but described as an "embodiment" to show the scope of the invention and indicate that it might (or might not) covered in a later arising claim (for example, an amended claim, a continuation application claim, a divisional application claim, a reissue application claim, a re-examination proceeding claim, an interference count); also, an embodiment that is indeed covered by claims filed with this patent document might cease to be covered by claim amendments made during prosecution.

First, second, third, etc. ("ordinals"): Unless otherwise noted, ordinals only serve to distinguish or identify (e.g., various members of a group); the mere use of ordinals shall not be taken to necessarily imply order (for example, time order, space order).

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication; data-communication-connected herein means connected in data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (ii) in a single proximity within a larger piece of software code; (iii) located within a single piece of software code; (iv) located in a single storage device, memory or medium; (v) mechanically connected; (vi) electrically connected; and/or (vii) connected in data communication.

Gateway: a computer or set of computer related components structured, connected and/or programmed to pass network communications from one network to another network.

Network protocol data: includes any data in a packet or MPDU that is extraneous to the payload, including, but not limited to, network protocols and/or network metadata.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control.

Unless otherwise explicitly provided in the claim language, steps in method steps or process claims need only be performed in the same time order as the order the steps are recited in the claim only to the extent that impossibility or extreme feasibility problems dictate that the recited step order be used. This broad interpretation with respect to step order is to be used regardless of whether the alternative time ordering (s) of the claimed steps is particularly mentioned or discussed in this document—in other words, any step order discussed in the above specification shall be considered as required by a method claim only if the step order is explicitly set forth in the words of the method claim itself. Also, if some time ordering is explicitly set forth in a method claim, the time ordering claim language shall not be taken as an implicit limitation on whether claimed steps are immediately consecutive in time, or as an implicit limitation against intervening steps.

What is claimed is:

1. A computer communication network system comprising: a source computer, an MPDU aggregating module, a connection-based network, a gateway, a receiver-side connectionless network, and a receiver computer, wherein:

the source computer is structured, and/or data-communication-connected to send a first packet, with the first packet including destination information indicating that it is intended to be sent to and received by the receiver computer;

the MPDU aggregating module is structured, programmed and/or data-communication-connected to receive the first packet from the source computer and to aggregate it into a first MPDU, where the first MPDU is in a form and format suitable to be communicated over the connection-based network;

the connection-based network is structured, programmed and/or data-communication-connected to receive the first MPDU from the MPDU aggregating module and to communicate it to the gateway in a connection-based manner;

the gateway is structured, programmed and/or data-communication-connected to receive the first MPDU from the connection-based network, to disaggregate the first MPDU into a plurality of smaller data units (DUs) including a first DU at least partially constituted by the first packet, and to selectively communicate the first DU to the receiver-side connectionless network;

the receiver-side connectionless network is structured, programmed and/or data-communication-connected to receive the first DU from the gateway on condition that it was selectively communicated by the gateway, and to communicate at least the first data packet portion of the first DU to the receiver computer in a connectionless manner;

the gateway is structured, programmed and/or data-communication-connected to collect selected network protocol data from the first MPDU, with the selected network protocol data including at least some network protocol data included in the first MPDU and not included in any of the plurality of DUs, and with the selected network protocol data relating exclusively to network protocols and including no data from any data payload(s) which may be present in the MPDU;

the gateway is further structured, programmed and/or data-communication-connected to apply a first rule to the selected network protocol data that has been collected by the gateway; and the gateway is further structured, programmed and/or data-communication-connected to selectively make a responsive reaction based, at least in part, upon the application of the first rule applied by the gateway to the selected network protocol data.

2. The system of claim 1 wherein the responsive reaction made by the gateway includes one or more of the following types of responsive reactions: (i) filtering the first DU so that it is selectively not communicated to the connectionless network, (ii) regulating communication of the first DU to the connectionless network, (iii) reallocating network resources of the system, and/or (iv) sending out an alert.

3. The system of claim 1 wherein:
each DU of the plurality of DUs is an individual packet; and
the first DU is the first packet.

4. The system of claim 1 wherein:
the DUs of the plurality of DUs are MPDUs; and
the first DU is the first packet.

5. The system of claim 1 wherein the MPDU aggregating module comprises a source-side connectionless network structured, programmed and/or data-communication-connected to receive the first packet from the source computer, to aggregate the first packet into the first MPDU and to communicate the first MPDU to the connection-based network in a connectionless manner.

6. The system of claim 1 wherein:
the first packet is a TCP/IP protocol type data packet; and
the first MPDU is a SONET type MPDU.

7. A gateway computer for use in a computer communication network system, the gateway computer comprising a non-transient software storage device with the following software encoded therein: a gateway module and an enhanced requesting module;

wherein:
the gateway module is structured, programmed and/or data-communication-connected to receive a first MPDU from a connection-based network of the computer communication network system, to disaggregate the first MPDU into a plurality of smaller data units (DUs), and selectively communicate the first DU to a receiver-side connectionless network of the computer communication network system; and the enhanced requesting module is structured, programmed and/or data-communication-connected to collect selected network protocol data from the first MPDU, with the selected network protocol data including at least some network protocol data included in the first MPDU and not included in any of the plurality of DUs, and with the selected network protocol data relating exclusively to network protocols and including no data from any data payload(s) which may be present in the MPDU;

the enhanced requesting module is further structured, programmed and/or data-communication-connected to apply a first rule to the selected network protocol data collected by the enhanced requesting module; and the enhanced requesting module is further structured, programmed and/or data-communication-connected to selectively make a responsive reaction based, at least in part, upon the application of the first rule by the enhanced requesting module to the selected network protocol data.

8. The gateway of claim 7 wherein:
each DU of the plurality of DUs is an individual packet; and
the first DU is the first packet.

9. The gateway of claim 7 wherein:
the DUs of the plurality of DUs are MPDUs; and
the first DU is the first packet.

10. The gateway of claim 7 wherein the responsive reaction made by the gateway includes one or more of the following types of responsive reactions: (i) filtering the first DU so that it is selectively not communicated to the connectionless network, (ii) regulating communication of the first DU to the connectionless network, (iii) reallocating network resources of the system, and/or (iv) sending out an alert.

11. The gateway of claim 7 wherein the enhanced requesting module comprises: an information dissector sub-module, a protocol/data sub-module, an analyzer sub-module, and a responsive reaction sub-module, wherein:
the information dissector sub-module is structured, programmed and/or data-communication-connected to dissect the first MPDU to collect the selected network protocol data;
the protocol/data sub-module is structured, programmed and/or data-communication-connected to store the selected network protocol data during at least the application of the first rule;
the analyzer sub-module is structured, programmed and/or data-communication-connected to apply the first rule; and
the responsive reaction sub-module is structured, programmed and/or data-communication-connected to make the responsive reaction.

12. The gateway of claim 11 wherein the information dissector sub-module comprises a physical layer determination sub-sub-module structured, programmed and/or data-communication-connected to collect a physical layer network protocol portion of the selected network protocol data.

13. The gateway of claim 11 wherein the information dissector sub-module comprises a data link layer determination sub-sub-module structured, programmed and/or data-communication-connected to collect a data link layer network protocol portion of the selected network protocol data.

14. The gateway of claim 11 wherein the information dissector sub-module comprises a network layer determination sub-sub-module structured, programmed and/or data-communication-connected to collect a data link layer network protocol portion of the selected network protocol data.

15. The gateway of claim 11 wherein the information dissector sub-module comprises a transport layer determination sub-sub-module structured, programmed and/or data-communication-connected to collect a data link layer network protocol portion of the selected network protocol data.

16. The gateway of claim 11 wherein the responsive reaction sub-module comprises a filter sub-sub-module for applying a responsive reaction in the form of filtering DU(s).

17. The gateway of claim 11 wherein the responsive reaction sub-module comprises a regulator sub-sub-module for applying a responsive reaction in the form of regulating the manner in which DU(s) are communicated to the receiver-side connectionless network.

18. The gateway of claim 7 wherein the enhanced requesting module is further structured, programmed and/or data-communication-connected to:
  apply a plurality of additional rules to the selected network protocol data, and
  selectively make additional responsive reactions respectively based, at least in part, upon the application of the each additional rule, of the plurality of additional rules, to the selected network protocol data.

19. The gateway of claim 18 wherein the enhanced requesting module is further, structured, programmed and/or data-communication-connected to receive at least some additional rules of the plurality of additional rules from a database external to and remote from the gateway.

20. A method of communicating a data unit through a computer communication network system, the method comprising the following steps:

receiving, by a gateway, a first MPDU from a connection-based network of the computer communication network system;

disaggregating, by the gateway, the first MPDU into a plurality of smaller data units (DUs);

collecting, by the gateway, selected network protocol data from the first MPDU, with the selected network protocol data including at least some network protocol data included in the first MPDU and not included in any of the plurality of DUs, and with the selected network protocol data relating exclusively to network protocols and including no data from any data payload(s) which may be present in the MPDU;

applying, by the gateway, a first rule to the selected network protocol data;

selectively making, by the gateway, a responsive reaction based, at least in part, upon the application of the first rule to the selected network protocol data at the applying step; and selectively communicating, by the gateway, the first DU to a receiver-side connectionless network of the computer communication network system on condition that the communicating of the first DU does not conflict with the responsive reaction of the selectively communicating step.

* * * * *